Dec. 24, 1968 W. W. SANFORD 3,417,449

METHOD OF MANUFACTURING PIEZOELECTRIC CRYSTAL ASSEMBLIES

Filed Dec. 16, 1966 2 Sheets-Sheet 1

INVENTOR
WILLIAM W. SANFORD

BY A. Yates Dowell I + II
ATTORNEYS

METHOD OF MANUFACTURING PIEZOELECTRIC CRYSTAL ASSEMBLIES

Filed Dec. 16, 1966 2 Sheets-Sheet 2

INVENTOR

WILLIAM W. SANFORD

BY

Yates Dowell I & II

ATTORNEYS

United States Patent Office 3,417,449

Patented Dec. 24, 1968

3,417,449
METHOD OF MANUFACTURING PIEZO-ELECTRIC CRYSTAL ASSEMBLIES

William W. Sanford, 714 E. Harwood St., Orlando, Fla. 32803

Continuation-in-part of application Ser. No. 387,714, Aug. 5, 1964. This application Dec. 16, 1966, Ser. No. 602,371
8 Claims. (Cl. 29—25.35)

Figure 1:
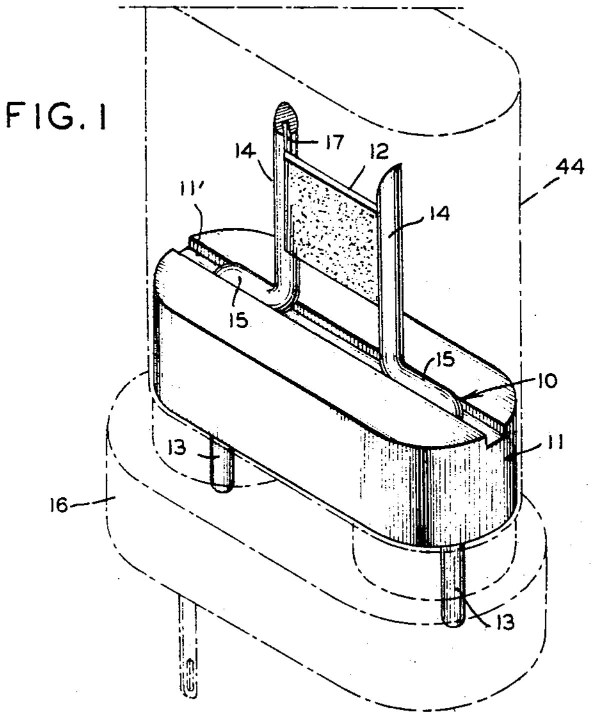

This is a continuation-in-part application of co-pending application Ser. No. 387,714, filed Aug. 5, 1964, now Patent No. 3,340,410.

This invention relates to electrical components of various kinds, to the fabrication and assembling of the same, and to the utilization in electrical circuits employed in various types of transmissions of electrical energy for use in numerous ways.

This invention relates particularly to piezoelectric crystals or subtances which when subjected to mechanical stress produce electrical potentials on the faces of such substances and when electrical potentials are applied to any of such faces the result is mechanical distortion of the substance of which the crystals are composed.

It is well known that certain substances or materials, including crystalline quartz, have the property of exchanging energy between the electrical and mechanical aspects of the same and that mechanical force applied in a particular or proper direction to the material will produce an electrical potential on the surface of the material, and conversely an applied electrical potential will result in mechanical displacement of the material, with such phenomenon known as the piezoelectric effect.

An alternating electric current or voltage of the correct frequency applied across the proper sides of a quartz crystal will cause it to vibrate, mechanically producing a resonance at a frequency determined by the mechanical dimensions of the quartz crystal, and at such resonant frequency the exchange of energy between the electrical and mechanical phases is extremely efficient with very little energy dissipated in the crystal. The frequency of this resonance is very sharply defined and quartz crystals have equivalent Q's or sharpness of resonance of 10,000 to 100,000. It is also known that the physical and electrical properties of quartz have small temperature coefficients of vibration, thus making quartz crystals ideal frequency stabilizing elements.

Quartz crystals are used extensively to control the frequency of radio frequency oscillators and as filter elements for which they are particularly suitable because of their stability, selectivity, excellent operating life, and on account of their low cost. Methods have been developed and utilized to produce large quantities of synthetic quartz, thus making available dependable sources of raw material of high quality. The assembling and processing of quartz crystal devices have been unsatisfactory because of the excessive time involved and the tedious manual method almost universally employed in the fabrication of such finished devices. This slow tedious and impractical manner of fabrication has been due at least in part on account of the fact that the physical structure of the available mounting and electrode devices has not permitted handling by mechanical means, or else satisfactory mechanical means for handling has not been discovered. Further, the various methods of processing quartz crystal have involved serious problems, with a detrimental effect on the performance of the finished product.

It is an object of the invention to provide a process or method of manufacturing a piezoelectric crystal assembly of mechanical and electrical stability without mechanically damping or interfering with the free vibration of the crystal and which permanently locks the crystal in a fixed position in the electrodes.

Another object of the invention is to provide a method of manufacturing a piezoelectric crystal in large quantities at low cost by automatic machinery and with minimum labor.

Figure 2:
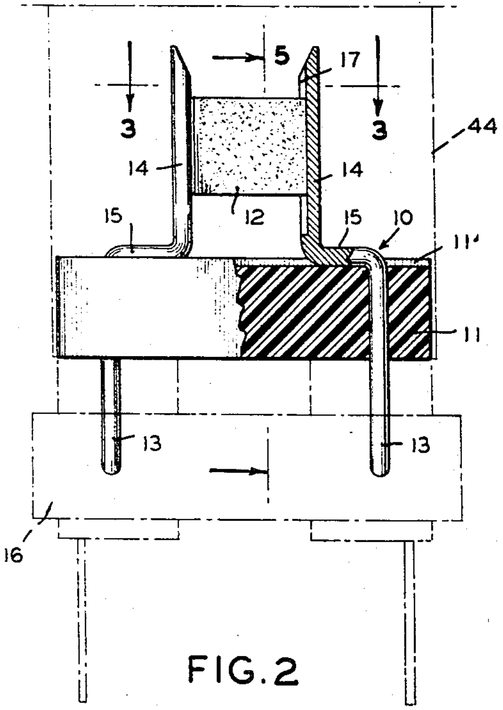
Figures 3, 4, 5:
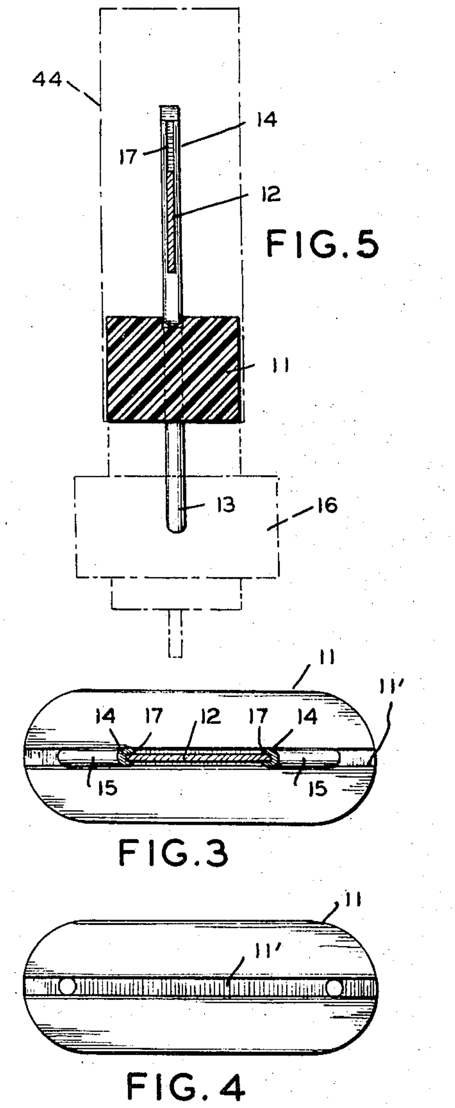
Figures 6, 7:
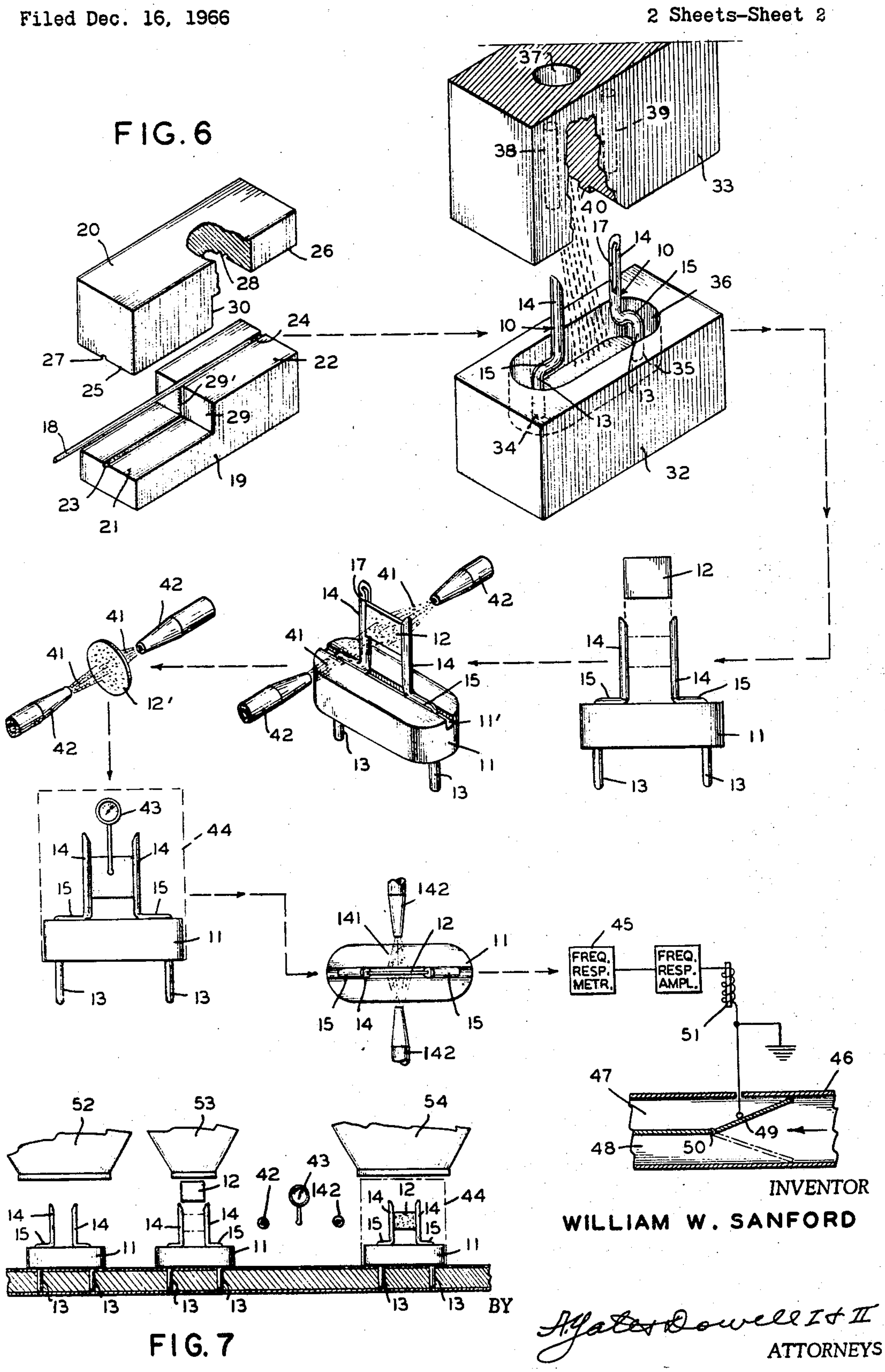

Other objects and advantages of the invention will be apparent from the following description considered in conjunction with the accompanying drawings wherein:

FIG. 1 is a perspective of a crystal assembly produced in accordance with the present invention;

FIG. 2, a side elevation, partly in section;

FIG. 3, a horizontal section on the line 3—3 of FIG. 2;

FIG. 4, a top plan view of the insulating base itself;

FIG. 5, a vertical section on the line 5—5 of FIG. 2;

FIG. 6, a schematic view or layout illustrating the steps in the process; and

FIG. 7, a fragmentary side elevation illustrating the manner of inserting the crystal.

The piezoelectric crystal assembly of the present invention comprises a pair of electrodes 10, a base or holder 11, and a quartz or piezoelectric crystal 12. The electrodes have lower and upper portions 13 and 14, respectively, with a connecting and offsetting portion 15 in order that the lower extremities 13 may be spaced the correct distance to be inserted in receiving openings of an electrical receptacle or socket member 16. The upper portions 14 are more closely spaced to receive therebetween a quartz or piezoelectric crystal of smaller dimensions. Further, each upper portion 14 is provided with a groove 17 lengthwise of each upper portion and with such grooves facing each other in order that the crystal may be inserted between such opposed parallel grooves or channelways and of a size to snugly receive the crystal therebetween.

A piezoelectric crystal assembly may be produced in accordance with the present invention by feeding a length or strand of wire 18 between a pair of lower and upper dies 19 and 20, the lower die 19 having stepped surfaces 21 and 22 with grooves 23 and 24 in which the wire 18 is received and the upper die 20 having stepped surfaces 25 and 26 with grooves 27 and 28, such groove 28 having a central rib which forms a slot in the wire when the dies are moved into contact one with the other. The grooves 27 and 28 complement the grooves 23 and 24 so that the wire 18 is securely received in such grooves. The die 19 is provided with a shoulder 29 with a groove 29' between its stepped surfaces 21 and 22 while the die 20 is provided with a shoulder 30 between the surfaces 25 and 26. The wire 18 is thus formed into the electrode 10 of the length and configuration as illustrated in FIG. 2.

In the practice of the process, the pair of electrodes 10 are placed in a combination jig and molding die 32 which operates in conjunction with a cooperating die 33. The jig or molding die 32 is provided with openings 34 and 35 in which the lower extremities or prongs 13 are adapted to be inserted. The jig and molding die 32 is provided with a mold cavity 36 which may be filled with an electricity insulating material which constitutes the base 11.

The upper mold die 33 has a feed channel or flume 37 through which such insulating or dielectric material is supplied, the mold having openings 38 and 39 in which the crystal holding portions of the electrodes are received as the upper mold die is moved downwardly. In order to secure the electrodes in fixed relation to the base or holder 11, such base is provided with a channel 11', and to form this channel the mold die 33 is provided on its underside with a rib 40, such rib corresponding in depth and width to the diameter of the offset portion 15 of the electrode 10.

The mounting base 11 may be produced in any desired manner as, for example, by compressing a powder, by introducing a solidifiable fluid of insulating substance and permitting it to set, or in any other desired manner. Thus when formed as directed the electrodes are disposed in fixed relation with opposed legs having the crystal receiving slots 17 facing each other and into such opposed slots or channels a predimensioned crystal can be slidably disposed.

After the predimensioned crystal is applied between the opposed channels, it may be reduced to a predetermined thickness in any desired manner as, for example, by means of the forcible discharge of abrasive particles such as sand and the like 41 through nozzles 42. After the crystal has been sandblasted to the desired predetermined thickness, the thickness of the crystal is measured by a measuring device 43 of any desired character, after which a conductive film of well known conductive substance 141 is applied to the opposite sides of the crystal through nozzles 142 in a manner to provide good electrical connections to the electrodes 10, one side being electrically connected to one electrode and the opposite side being electrically connected to the other electrode.

To complete the crystal assembly, a cover 44 is applied over the crystal and the upper portions of the electrodes between which the crystal is mounted. The cover is of a size to fit snugly over the mounting base and provide a hermetically sealed air and watertight joint.

Instead of the crystal 12, a crystal 12' of other marginal configuration may be provided as illustrated.

After the crystal assembly is completed, it is subjected to a precise frequency measurement by means of a digital frequency meter 45 of conventional character which indicates frequencies directly and the devices are discharged through a discharge 46 which is connected to a pair of discharges 47 and 48 with an oscillatable valve 49 mounted upon a pivot 50 with such valve controlled by a solenoid 51 so that the crystals which pass the quality control test travel in one path and those which do not, in another.

As indicated the invention contemplates the manufacture of the assembly by automatic machinery with minimum human supervision and at small cost. This is done by providing magazines 52, 53, and 54 for the receipt of molded bases or holders and electrode assemblies, the crystals, and the covers. The base and electrode assemblies are discharged from the magazines and the crystals are fed from the magazine into the base and electrode assembly. Thereafter the reduction in thickness is accomplished after the crystal is in place, the crystal tested for thickness, sprayed with conductive material and the cover is applied and the completed article is discharged.

It will be obvious to those skilled in the art that various changes may be made in the invention without departing from the spirit and scope thereof and therefore the invention is not limited by that which is illustrated in the drawings and described in the specification but only as indicated in the accompanying claims.

What is claimed is:

1. A method of producing a piezoelectric crystal assembly comprising the steps of providing a pair of electrodes each having a crystal receiving groove, mounting said electrodes in fixed position on a base with said grooves facing each other and said electrodes extending from opposite sides thereof, providing a crystal of a size to extend from one electrode to the other, mounting said crystal within said grooves, altering said crystal to a desired thickness, and applying a conductive film to opposed surfaces of said crystal in a manner to provide an electrical connection between each electrode and one surface of said crystal.

2. The method of claim 1 in which each of said electrodes includes an offset portion to facilitate attachment to said base.

3. The method of claim 2 including the additional step of providing a groove in said base for the reception of said offset portions of said electrodes.

4. The method of claim 1 including the additional step of testing the thickness of said crystal after the crystal has been altered.

5. The method of claim 1 including the additional steps of applying a cover on said base over said crystal, and measuring the precise frequency of said crystal.

6. The method of producing a piezoelectric crystal assembly comprising the steps of providing a pair of electrodes each having a crystal receiving groove, providing a fixture in which said electrodes are received, said fixture having a central opening with a flume providing communication between said opening and the exterior of said fixture, placing said pair of electrodes within said fixture with the electrodes extending through said central opening and said grooves facing each other, introducing a hardenable insulating material into said opening through said flume to form a base in which portions of said electrodes are embedded, removing said electrodes and said base from said fixture after said insulating material has hardened, providing a crystal of a size to extend from one electrode to the other, mounting said crystal within said grooves, and applying a conductive film to opposed surfaces of said crystal in a manner to provide an electrical connection between each electrode and one surface of said crystal.

7. The method of claim 6 including the additional step of altering said crystal to a desired thickness after said crystal is mounted in said grooves.

8. The method of claim 6 including the additional steps of placing a cover on said base over said crystal, sealing said cover in position, and measuring the precise frequency of said crystal.

References Cited

UNITED STATES PATENTS

| | | | |
|---|---|---|---|
| 2,784,326 | 3/1957 | Purdue ____________ | 310—9.4 |
| 2,857,532 | 10/1958 | Ziegler ___________ | 310—9.7 X |

WILLIAM I. BROOKS, *Primary Examiner.*

U.S. Cl. X.R.

29—203, 593